United States Patent Office 3,271,460
Patented Sept. 6, 1966

3,271,460
METHOD OF PREPARING ORGANOPHOSPHORUS COMPOUNDS
Albert Y. Garner, Yellow Springs, Ohio, assignor to Monsanto Research Corporation, St. Louis, Mo., a corporation of Delaware
No Drawing. Filed June 28, 1962, Ser. No. 205,841
3 Claims. (Cl. 260—606.5)

This invention relates to methods of preparing organophosphorus compounds and more particularly relates to the production of aromatic compounds containing aromatic carbon to phosphorus linkages.

According to the invention there are prepared compounds of the formula $(Ar-P)_n$ wherein Ar is an aromatic hydrocarbon radical and $n$ is a number denoting a low degree of polymerization, by the reaction of an arylphosphonous dihalide and an active metal in the presence of an inert, polar solvent substantially according to the following scheme:

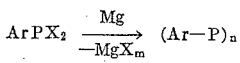

$$ArPX_2 \xrightarrow[-MgX_m]{Mg} (Ar-P)_n$$

wherein Ar is hydrocarbon of from 6 to 12 carbon atoms which is free of olefinic and acetylenic unsaturation and is linked through an aromatic nuclear carbon to the remainder of the molecule of which it forms a part, X is halogen, $n$ is a number denoting a degree of polymerization of from 2 to 6, and $m$ is a number corresponding to the valence of said metal.

The presently prepared compounds $(Ar-P)_n$ are believed to be phosphorus arenes of the formula $Ar-P=P-Ar$, dimers or trimers thereof or mixtures consisting of varying proportions of monomeric, dimeric and trimeric phosphorus arenes. Although elemental analyses of the products corresponds to Ar-P, molecular weight determinations indicate a state of polymerization which varies according to the nature of solvent employed in said determination, but which is less than 7. For convenience, the products will be hereinafter referred to as $(Ar-P)_n$ compounds.

The presently presently prepared phosphorus arenes are stable compounds which are generally high melting solids or thick viscous liquids. They are advantageously employed for a variety of industrial purposes, e.g., as stabilizing additives for thermally stable functional fluids of the polyphenyl ether or polyester types. However, they also provide a convenient means of preparing aromatic phosphonic acids or phosphonothioic acids and esters thereof; thus, upon treatment with an oxidizing agent such as air, hydrogen peroxide or nitric acid in presence of water, the $(Ar-P)_n$ compounds are readily converted to $$Ar-P(O)(OH)_2$$

and by employing sulfur instead of an oxidizing agent they are converted to $Ar-P(S)(OH)_2$.

Arylphosphonous dihalides from which the $(Ar-P)_n$ compounds are prepared according to the invention include, e.g., phenylphosphonous dichloride, dibromide, difluoride or diiodide and nuclearly alkylated derivatives thereof such as o-, m-, or p-tolylphosphonous dichloride or dibromide, o-, m- or p-, ethyl-, isopropyl-, butyl-, pentyl- or hexylphenylphosphonous dichloride or diiodide, 2,3- or 3,4-xylylphosphonous dibromide or difluoride, pentamethylphenylphosphonous dichloride or dibromide, α- or β-naphthylphosphonous dichloride or diiodide, o-, m- or p-xenylphosphonous dichloride or dibromide, 2 - acenaphthenylphosphonous dichloride or dibromide, o-, m- or p-cyclopentyl- or cyclohexylphenylphosphonous dichloride, etc.

While use of the magnesium in stoichiometric proportions is advantageous, greater amounts of either the dihalide or the metal may be employed, since unreacted material is easily removed from the final reaction product by filtration, distillation, etc.

Examples of presently useful polar solvents include dioxane, acetone, tetrahydrofuran, nitromethane, dimethyl sulfoxide, nitrobenzene, chloroform, acetonitrile, etc. Since the arylphosphonous dihalide is very reactive with alcohols, alkanethiols or primary or secondary amines, such materials cannot serve as insert solvents or diluents in the reaction. Also, owing to the fact that the dihalide reactant is an acyl halide, in order to obtain good yields of the $(Ar-P)_n$ compounds, the reaction should be effected under substantially anhydrous conditions in order to avoid dissipation of the arylphosphonous dihalide.

Reaction of the magnesium with the arylphosphonous dihalide to form the phosphorus arenes occurs readily at ordinary, decreased or increased temperatures, e.g., at temperatures from say 0° C. to the refluxing temperature of the reaction mixture depending upon the nature of the individual reactants. Generally reaction is exothermic and, depending upon the reactivity of the acyl halide, external cooling may be advantageously employed to moderate the initially vigorous reaction. In order to assure completion of the reaction external heating may be subsequently applied. The reactivity of the acyl halide will vary with the nature of the halogen constituent thereof, i.e., with whether it is a cholride, iodide, fluoride or bromide, and with the molecular weight of the acyl halide, the higher molecular weight compounds such as the xenyl and the naphthyl compounds being more sluggish. Since ease and speed of reaction will depend upon the individual reactants it is recommended that for initial runs, the preparation first be attempted by slow addition of acyl halide in polar solvent at ordinary or decreased temperature to a slurry of the metal and solvent.

The $(Ar-P)_n$ compound product will generally be soluble in the polar solvent. It can be separated from the reaction mixture by methods ordinarily employed in isolating procedures, e.g., fractional distillation, solvent extraction, fractional crystallization, etc. Advantageously any unreacted dihalide and the metal halide by-product may be washed out, and the residual $(Ar-P)_n$ compound allowed to crystallize.

The invention is further illustrated by, but not limited to, the following example.

Example

Phenylphosphonous dichloride (53.7 g., 0.3 mole) was added dropwise to a mixture of 7.29 g. (0.3 mole) of magnesium suspended in tetrahydrofuran as reaction diluent. A vigorous reaction occurred immediately. During the addition it was noted that whenever introduction of the phenylphosphonous dichloride was halted, the color of the reaction mixture changed from beige to dark red, and that the dark red color disappeared as soon as addition of the dichloride was resumed. When all of the dichloride had been added, and the vigorous reaction had subsided and the mixture had started to thicken, external heating was applied to bring the reaction mixture to reflux. Refluxing was maintained for three hours, at the end of which time all of the magnesium metal had been consumed.

The reaction mixture was then allowed to cool to room temperature, and 300 ml. of water was added thereto. The resulting aqueous layer was decanted, and ethyl ether was added to the residual thick syrup, whereupon the latter was converted to a crystalline solid. It was filtered off and washed several times with ether, and finally recrystallized from boiling ether to give the substantially pure phosphorus-benzene compound, M.P. 150° C. and analyzing as follows:

Found: Percent C, 65.96; percent H, 4.51; percent P, 28.85. Calc'd for $C_6H_5P$: Percent C, 66.6; percent H, 4.63; percent P, 28.70.

Infra-red analysis of the compound showed presence of P-phenyl absorption at 1440 cm.$^{-1}$. Molecular weight determination indicates the product to be $(C_6H_5P)_n$ wherein $n$ is a number of from 2 to 6.

In other experiments, the same product was obtained when instead of using tetrahydrofuran as solvent, there was used either chloroform, acetone or acetonitrile.

Operating as above, but using p-butylphenylphosphonous dibromide instead of phenylphosphonous dichloride, there is obtained the polymeric $(C_4H_9—C_6H_4—P)_n$ compound.

Considerable modification is possible in selection of the various materials for the aromatic phosphonous dihalide reactant, and the polar solvent, as well as in the combinations thereof, in the reactant proportions, and the reaction time and temperature without departing from the scope of the invention.

What I claim is:
1. The method of preparing the compound $(ArP)_n$ wherein Ar is an aromatic hydrocarbon radical of from 6 to 12 carbon atoms which is free of olefinic and acetylenic unsaturation and $n$ is a number of from 2 to 6, which comprises contacting with magnesium a compound of the formula $ArPX_2$ wherein Ar is as above defined and X is halogen in the presence of a solvent selected from the class consisting of tetrahydrofuran, chloroform, acetone and acetonitrile.

2. The method of preparing the compound of the formula (phenyl-P)$_n$ where $n$ is a number of from 2 to 6 which comprises contacting phenylphosphonous dihalide with magnesium in the presence of tetrahydrofuran.

3. The method of preparing the compound of the formula (phenyl-P)$_n$ wherein $n$ is a number of from 2 to 6 which comprises contacting phenylphosphonous dichloride with magnesium in the presence of tetrahydrofuran.

References Cited by the Examiner
UNITED STATES PATENTS

| | | | |
|---|---|---|---|
| 3,032,591 | 4/1962 | Henderson et al. | 260—606.5 |
| 3,069,246 | 12/1962 | Loper et al. | 260—606.5 XR |

OTHER REFERENCES

Pass et al., Monatsh, vol. 90, pp. 148–56 (1959), abstracted in Chem. Abstracts, vol. 54, pp. 4437–8 (1960).

TOBIAS E. LEVOW, *Primary Examiner.*

OSCAR R. VERTIZ, *Examiner.*

L. A. SEBASTIAN, F. R. OWENS, W. F. W. BELLAMY,
*Assistant Examiners.*